(No Model.)
J. H. READER.
BOILER.
No. 521,476. Patented June 19, 1894.
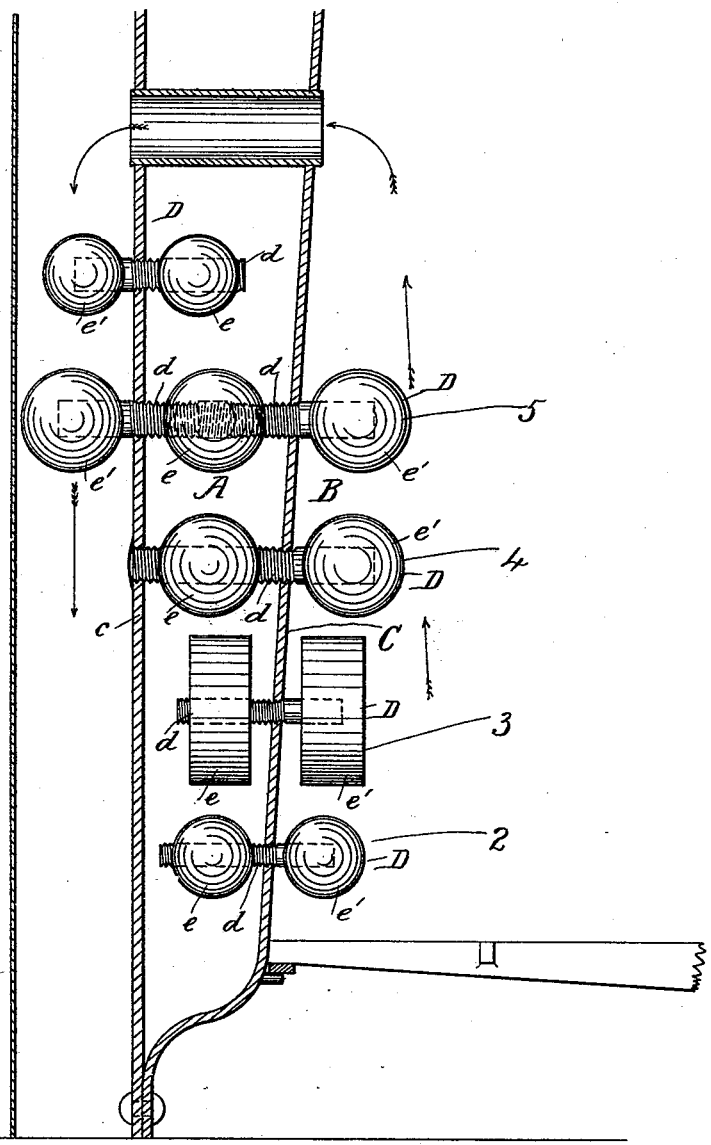
WITNESSES
George H. Bliss
J. H. Watson
INVENTOR
James H. Reader
by Herbert W. Jenner
Attorney

UNITED STATES PATENT OFFICE.

JAMES H. READER, OF TYRONE, PENNSYLVANIA.

BOILER.

SPECIFICATION forming part of Letters Patent No. 521,476, dated June 19, 1894.

Application filed March 22, 1894. Serial No. 504,662. (No model.)

*To all whom it may concern:*

Be it known that I, JAMES H. READER, a citizen of the United States, residing at Tyrone, in the county of Blair and State of Pennsylvania, have invented certain new and useful Improvements in Boilers; and I do hereby declare the following to be a full, clear, and exact description of the invention, such as will enable others skilled in the art to which it appertains to make and use the same.

This invention relates to boilers and other similar vessels in which water, air, or other liquids or gases, are heated; and it consists in the novel construction and combination of the parts hereinafter fully described and claimed, whereby the heat of the fire in the firebox is communicated to the water or air inside the vessel.

The drawing shows a portion of the firebox and waterspace of a boiler in cross-section and provided with heat conductors according to this invention.

A is a portion of the waterspace of a boiler or other similar vessel in which water or air is heated.

B is a portion of the firebox, or it may be a heating flue or passage through which a current of heated air or gas is passing.

C is the metallic plate which separates the space A from the space B.

In order to increase the heating capacity of the boiler and economize fuel, a series of heat conductors D is provided. These heat conductors may be made of many different forms in carrying out this invention; several forms are illustrated in the drawing, and the boiler may be provided with a series of either form, or several forms may be used in the same boiler. The heat conductors are placed all over the heating surface of the boiler at a little distance apart. Each heat conductor consists essentially of a stem $d$ screwed into the plate C, and having a metallic head $e$ inside the chamber A, and a metallic head $e'$ inside the chamber B. Each stem $d$ is screwed through the plate C up to the shoulder formed by the end of the screwthread around the periphery of the stem, so that a tight joint is assured. The head $e'$ becomes very hot by being directly exposed to the heat in the chamber B, and transmits its heat through the stem $d$ to the head $e$, which heats the water or air in the chamber A. The heat conductors can be applied to horizontal and inclined plates as well as to vertical plates, and effect a great economy in heating water or air.

The heat conductor shown at 2 is the simplest form of the device. The stem has a ball cast upon one end of it, and its other end is screwed into a similar ball.

At 3 the heads $e$ and $e'$ consist of disks instead of balls.

At 4 the stem $d$ is screwed through the plate $c$ after passing through the head $e$, and has its end riveted over, thereby forming a stay for the plates C and $c$ as well as a support for the heads.

At 5 two stems are shown screwed through the plates C and $c$ and into a single head $e$. This form of the device is used when there is a heating chamber on each side of the water space A. The two stems and the head $e$ then form a stay and the heat is conducted to the head $e$ from each side.

The form of the heads $e$ and $e'$ is not material, and they may be of any form which will adapt them to best receive and transmit the heat, according to the various circumstances and conditions under which they are used.

I do not confine myself to the heat transmitters when applied to a boiler in which steam is generated, as they can be applied to boilers and heaters in which water and other substances are merely heated.

What I claim is—

1. In a boiler, the combination, with a water or air space having a plate C on one side, of a heat transmitter consisting of a stem having a head cast upon one end of it, a screw-threaded portion screwed through the said plate and forming a tight joint therewith, and a movable head screwed on its other end, substantially as set forth.

2. In a boiler, the combination, with the plates C and $c$ inclosing a water or air space, of a combined heat transmitter and stay consisting of a stem screwed through the said plates and having an exterior head and a head on its screwthreaded portion between the plates, substantially as set forth.

3. In a boiler, the combination, with the plates C and c inclosing a water or air space, of a combined heat transmitter and stay consisting of two stems screwed through the said plates from opposite sides, each stem being provided with an exterior head, and a head coupling the screwthreaded ends of the stems in the said space, substantially as set forth.

In testimony whereof I affix my signature in presence of two witnesses.

JAMES H. READER.

Witnesses:
H. B. CALDERWOOD,
W. WALTON.